United States Patent [19]

Reitz et al.

[11] 4,101,489
[45] Jul. 18, 1978

[54] WATER-SOLUBLE PHENOL/FORMALDEHYDE CONDENSATION PRODUCTS

[75] Inventors: Gunther Reitz, Cologne; Günther Boehmke, Leverkusen, both of Germany

[73] Assignee: Bayer Aktiengesellschaft, Leverkusen, Germany

[21] Appl. No.: 774,455

[22] Filed: Mar. 4, 1977

[30] Foreign Application Priority Data

Mar. 8, 1976 [DE] Fed. Rep. of Germany ....... 2609531

[51] Int. Cl.$^2$ ............................................. C08L 61/08
[52] U.S. Cl. .................................. 260/29.3; 252/355
[58] Field of Search .................. 260/29.3, 59 R, 49; 252/353, 357

[56] References Cited

U.S. PATENT DOCUMENTS

| | | | |
|---|---|---|---|
| 2,837,563 | 6/1958 | Alles | 260/59 |
| 2,870,041 | 1/1959 | Waddle et al. | 260/59 |
| 3,328,354 | 6/1967 | Dietrick | 260/29.3 |
| 3,684,467 | 8/1972 | Smucker et al. | 260/29.3 |
| 3,870,671 | 3/1975 | Aignesberger et al. | 260/29.4 |

*Primary Examiner*—Theodore E. Pertilla
*Attorney, Agent, or Firm*—Plumley and Tyner

[57] ABSTRACT

Water-soluble condensation products which are obtained by reacting mononuclear phenol/formaldehyde/bisulphite condensation products with formaldehyde and, if appropriate, notrogen-containing compounds of a type which can react with at least 2 equivalents of formaldehyde, can be used as dispersing agents.

7 Claims, No Drawings

WATER-SOLUBLE PHENOL/FORMALDEHYDE CONDENSATION PRODUCTS

The present invention relates to water-soluble condensation products which are obtained by reacting mononuclear phenol/formaldehyde/bisulphite condensation products with formaldehyde and, if appropriate, nitrogen-containing compounds of a type which can react with at least 2 equivalents of formaldehyde, and to their use as dispersing agents.

Mononuclear condensation products are to be understood as those products which are monomeric with respect to phenol and are obtained by reacting phenol, formaldehyde and bisulphite in a molar ratio of in particular 1:0.9–1.1:0.9–1.1, in any desired sequence, in an aqueous medium in the presence of a basic catalyst. Preferably, 0.2 to 14 mol%, in particular 0.2 – 3.5 mol%, of the alkali catalyst, relative to phenol, are employed. The reaction time is between 5 and 48 hours at temperatures between 40° C and the boiling point.

Formaldehyde donors, such as paraformaldehyde, can also be employed in place of formaldehyde. The formaldehyde is preferably employed in 25 to 40% strength aqueous solution.

Alkali metal bisulphites and alkaline earth metal bisulphites, in particular sodium bisulphite and potassium bisulphite, can be used as the bisulphites. They are employed, for example, in the form of 35–45% strength by weight aqueous solutions.

Examples of basic catalysts which may be mentioned are NaOH, KOH, $Na_2CO_3$, $K_2CO_3$, $NaHCO_3$; $KHCO_3$, CaO, $CaCO_3$, triethanolamine or alkyldiethanolamine.

The process for the preparation of the mononuclear condensation products can be carried out in various ways.

For example, phenol and formaldehyde or paraformaldehyde can be reacted in an approximately equimolar ratio, in particular in a ratio of 1:0.9 to 1.1, under mild conditions, that is to say at temperatures between 40° and 100° C, in the presence of small amounts of basic catalysts, in particular of 0.2–3.5 mol%, relative to phenol, in the course of 15 minutes to 2 hours to give a mixture of monomethylolphenol, bimethylolphenol and trimethylolphenol. Chromatographic investigations have shown that about 70–80% of these methylolated phenols are formed in one hour at 80° C from phenol, one equivalent of 30% strength formaldehyde and 1.3 mol%, relative to phenol, of NaOH, no significant further condensation being observable. The main products are o-substituted and p-substituted monomethylolphenol, the preparation of which is known, for example, from German Patent No. 85,588. These methylolphenols react with approximately equimolar amounts of bisulphite, in particular with 0.9 to 1.1 mol of bisulphite, relative to phenol, at preferably 60° to 100° C in the course of 5 minutes to 3 hours to give mononuclear condensation products of the abovementioned type.

The procedure followed can also be such that the bisulphite is added to the methylolphenols before the reaction of phenol with formaldehyde is complete. For example, the bisulphite can be added after about 5 minutes' reaction between phenol and formaldehyde.

A further route for the preparation of the mononuclear condensation product is that phenol and hydroxymethanesulphonate are reacted in a molar ratio of 1:0.9–1.1 in an aqueous medium in the presence of an alkali catalyst. In this case, 7–14 mol% of the alkali catalyst, relative to phenol, are preferred. The preferred reaction temperatures are between 70° C and 150° C, preferably between 70° C and the boiling point, and the reaction times are, in particular, between 4 and 48 hours.

The hydroxymethanesulphonate is employed as the alkali metal salt or alkaline earth metal salt, preferably as the Na salt or K salt.

The aqueous solutions, thus prepared, of the mononuclear condensation products have in most cases a solids content of about 40 – 60%. The solutions can be employed as such in the further condensation which is described in the following text.

Since the mononuclear condensation products have a very high, that is to say an about equimolar, content of sulphonate, the products possess very good solubility in water after the further condensation. In the mononuclear condensation products, the phenol molecule is, as a rule, substituted by one methanesulphonate group so that merely two reactive positions remain which can then react, even if they are partially substituted by methylol groups, in the further condensation to give linear products having excellent dispersing properties.

The further condensation of the mononuclear condensation products to give the products according to the invention is carried out either with approximately equimolar amounts of formaldehyde, preferably with 0.8 to 1.1 mols of formaldehyde per mol of phenol, or with formaldehyde and nitrogen-containing compounds of a type which can react with at least 2 mols of formaldehyde, in which case 0.8 – 4.0, preferably 0.8 – 2.0 equivalents of formaldehyde and 0.1 – 2.0, preferably 0.1 – 1.0 equivalent of the abovementioned nitrogen-containing compound, in each case relative to the amount of phenol, are employed.

In the further condensation, the reactants can either be added together simultaneously, or the mononuclear condensation product is allowed to react with lesser amounts of formaldehyde, preferably with 0.2 to 1.0 mol, for 1 to 60 minutes at 60° C to 150° C, preferably at up to the boiling point, and is subsequently reacted with 0.1 to 2, preferably 0.1 to 1 mol of the nitrogen-containing compound and, if appropriate, further formaldehyde.

It is also possible first to react the nitrogen-containing compound with formaldehyde, in particular in a molar ratio of 1:2, and subsequently to react the product with the mononuclear condensation product.

The methylol groups-and nitrogen-containing compound and the mononuclear condensation product can react, optionally in aqueous solution, in a molar ratio of 0.1 – 2:1, preferably 0.1 – 1:1.

The reaction temperatures for obtaining the end product are 60° C to 150° C, and preferably up to the boiling point, and the preferred reaction times are between 1 and 20 hours.

The further condensation can be carried out in an aqueous alkaline, neutral or acid medium. The medium and the concentration which are obtained in the preparation of the mononuclear condensation product are preferred.

Examples of nitrogen-containing compounds are urea, alkylureas, carboxylic acid amides, ureides, carbamic acids and melamines. Urea is preferred.

In this way, stable concentrated aqueous solutions which preferably contain a solids content of 40–50% by weight are obtained. These are transparent solutions which have a brown or red-brown colour and have no reducing properties. They can be evaporated to give dry loose powders which are not hygroscopic.

One advantage of the dispersing agents thus obtained is, in particular, the considerably weaker alkalinity of the solutions, as compared with known dispersing agents which are prepared by condensation reaction of cresol, formaldehyde and sodium sulphite. Thus, for example, in the case of a condensation product of cresol/30% strength formaldehyde/crystalline sodium sulphite in a weight ratio of 159:200:209, 30.3 ml of 0.1 N $H_2SO_4$ (determined by potentiometric titration) are required for neutralisation per g of dry solids, whilst, for example in the case of a product according to Example 1 of this invention, only 1.5 ml of 0.1 N $H_2SO_4$ are needed per g of dry solids. The abovementioned strong alkalinity is undesirable since it leads to the objectionable introduction of salt into the effluent when the products are neutralised before, during or after their use. If it is attempted to carry out a condensation reaction with cresol, formaldehyde and sodium bisulphite in the same molar ratio as above, water-insoluble resins without dispersing power are obtained. Thus, the use of sodium sulphite in the preparation of the condensation products, already known, of cresol, formaldehyde and sodium sulphite is absolutely necessary. This is, however, always associated with a strong alkalinity of the products.

The compounds obtained according to the invention are outstanding dispersing agents for inorganic or organic compounds, preferably for dyestuffs, for example in dyeing polyesters. They are likewise suitable as auxiliaries for finishing dyestuff dispersions.

EXAMPLE 1

94 g of phenol (= 1 mol) and 83.3 g of 36% strength formaldehyde solution (= 1 mol) are warmed to 80° C with 3 g of 45% strength sodium hydroxide solution and stirred at this temperature for 5 minutes. 248 g of 42% strength $NaHSO_3$ solution (= 1 mol) are then added and the mixture is heated to the boil for 40 minutes. A further 83.3 g of 36% strength formaldehyde solution (= 1 mol) are then added. The mixture is heated to the boil for a further 6 hours. A light brown solution with a solids content of about 43% is formed.

The test as a dispersing agent is carried out as follows: 400 ml of water, which has a temperature of 50° C and contains 1 g/l of the above solution, is poured, whilst stirring, over 0.8 g of Resolinscharlach 3 GL (Disperse Red 106) and the mixture is brought to the boil for 10 minutes. It is then filtered in vacuo through a circular filter. The paper filter remains clear and shows no agglomeration of dyestuff.

EXAMPLE 2

94 g of phenol (= 1 mol), 134 g of sodium hydroxymethanesulphonate (= 1 mol), 220 ml of $H_2O$ and 7 g of 45% strength sodium hydroxide solution (= 0.08 mol) are heated to the boil for 8 hours, whilst stirring. 83.3 g of a 36% strength formaldehyde solution are then added to the clear solution and the mixture is heated to the boil for a further 8 hours. The light brown, clear, approximately 41% strength solution is tested for its dispersing effect as in Example 1. Here too, the circular filter remains clear and shows no agglomeration of dyestuff.

EXAMPLE 3

94 g of phenol, 75.2 g of 36% strength formaldehyde and 3 g of 45% strength sodium hydroxide solution are warmed to 80° C, whilst stirring, and kept under these conditions for one hour. 248 g of a 42% strength $NaHSO_3$ solution are then added and the mixture is heated to 100° C for half an hour. A further 75.2 g of the 36% strength formaldehyde solution are then added and the mixture is stirred at the boiling point for ten minutes. 30 g of urea and 113 g of the 36% strength formaldehyde solution are then added and the mixture is stirred at 100° C for a further 6 hours. The light brown, clear solution has a strength of about 44%. When tested as in Example 1, the circular filter remains clear and shows no agglomeration of dyestuff.

EXAMPLE 4

94 g of phenol and 83.3 g of a 36% strength formaldehyde solution are warmed to 80° C for one hour, whilst stirring, with 1 g of 45% strength sodium hydroxide solution. 248 g of a 42% strength $NaHSO_3$ solution are then added and the mixture is then heated to the boil for 30 minutes. A further 83.3 g of the 36% strength formaldehyde solution are then added and the mixture is stirred at the boil for a further 8 hours. The red-brown clear solution has a strength of about 43% and displays a very good dispersing action according to the test in Example 1: the circular filter remains clear and shows no agglomeration of dyestuff.

EXAMPLE 5

94 g of phenol, 134 g of sodium hydroxymethanesulphonate, 12 g of 45% strength sodium hydroxide solution and 220 g of $H_2O$ are heated to the boil for 8 hours, whilst stirring. 100 g of a 30% strength formaldehyde solution (= 1 mol) are then added. The mixture is held at the boil for 15 minutes and 30 g of urea and 50 g of the 30% strength formaldehyde solution are then added. The mixture is held at the boil for a further six hours and a light brown, approximately 41% strength, clear solution is obtained. The dispersion test according to Example 1 shows a clear circular filter and no agglomeration of dyestuff.

EXAMPLE 6

94 g of phenol, 101.6 g of a 29.5% strength formaldehyde solution and 3 g of a 45% strength sodium hydroxide solution are warmed to 80° C for 1 hour, whilst 262.5 g of a 39.6% strength $NaHSO_3$ solution are then added and the mixture is then heated to the boil for 30 minutes. To this solution is added at 90° C a mixture, which is obtained from 60 g of urea, 70 mg of soda and 203.4 g of a 29.5% strength formaldehyde solution at 80° C whilst stirring. The mixture is held at the boil for a further 4 hours and a light brown, approximately 36% strength, clear solution is obtained. The dispersion test according to Example 1 shows a clear circular filter and no agglomeration of dyestuff.

We claim:
1. Dispersing agent which is the reaction product of
   1. a mononuclear phenol/formaldehyde/bisulfite condensation product resulting from the condensation of 0.9–1.1 mols of each of formaldehyde and bisulfite per mol of phenol in an aqueous medium in the presence of a basic catalyst, and
   2. per mol of phenol in said condensation product
      a. 0.8–1.1 mols of formaldehyde or b. 0.8–4.0 mols of formaldehyde and 0.1–2.0 mols of a nitrogen-containing compound capable of reacting with at lease two equivalents of formaldehyde.

2. Dispersing agent of claim 1, wherein urea is the said nitrogen-containing compound.

3. Dispersing agent of claim 1, wherein dimethylolurea is the said nitrogen-containing compound.

4. Dispersing agent of claim 1, wherein the said basic catalyst is present in the amount of 0.2 – 3.5 mol%, based on the phenol.

5. Dispersing agent according to claim 1, wherein said condensation product is the result of reacting phenol and hydroxymethanesulphonate in the presence of 7–14 mol%, based on the phenol, of a basic catalyst.

6. Dispersing agent of claim 1, wherein the said condensation product is prepared at a reaction temperature of 40° C to the boiling point and a reaction time of 5 minutes to 48 hours.

7. Dispersing agent of claim 1, wherein the reaction of said condensation product with formaldehyde or with formaldehyde and a nitrogen-containing compound is carried out between 60° C and the boiling point for a time of 1 to 20 hours.

\* \* \* \* \*